United States Patent

[11] 3,590,368

| [72] | Inventor | Philippe Esclangon |
| --- | --- | --- |
| | | Chatenay-Malabry, France |
| [21] | Appl. No. | 791,967 |
| [22] | Filed | Jan. 17, 1969 |
| [45] | Patented | June 29, 1971 |
| [73] | Assignee | Electricite De France Service National |
| | | Paris, France |
| [32] | Priority | Jan. 24, 1968 |
| [33] | | France |
| [31] | | 137,176 |

[54] DETECTION OF FAULTS ON A POWER TRANSMISSION LINE
4 Claims, 2 Drawing Figs.

[52] U.S. Cl. .................................................. 324/51,
317/28
[51] Int. Cl. ............................................. G01r 31/02
[50] Field of Search ........................................ 324/51, 52;
317/28, 29

[56] References Cited
UNITED STATES PATENTS
| 2,717,992 | 9/1955 | Weintraub. ................. | 324/52 |
| --- | --- | --- | --- |
| 2,794,071 | 5/1957 | Hughes..................... | 324/52 |

*Primary Examiner*—Michael J. Lynch
*Attorney*—Spencer and Kaye

ABSTRACT: Faults occurring in a power transmission line connected between two stations are detected by deriving, at each station, a test quantity obtained by subtracting a signal equal to the current level at that station multiplied by the characteristic impedance of the transmission line from a signal equal to the voltage level on the line at that station, by modifying one of the test quantities by multiplying it by the propagation factor of the transmission line, and by comparing such modified test quantity with the other test quantity. If the comparison reveals that the compared quantities are essentially equal, this indicates that no fault exists in the transmission line, whereas the existence of an inequality between the compared quantities indicates that a fault is present.

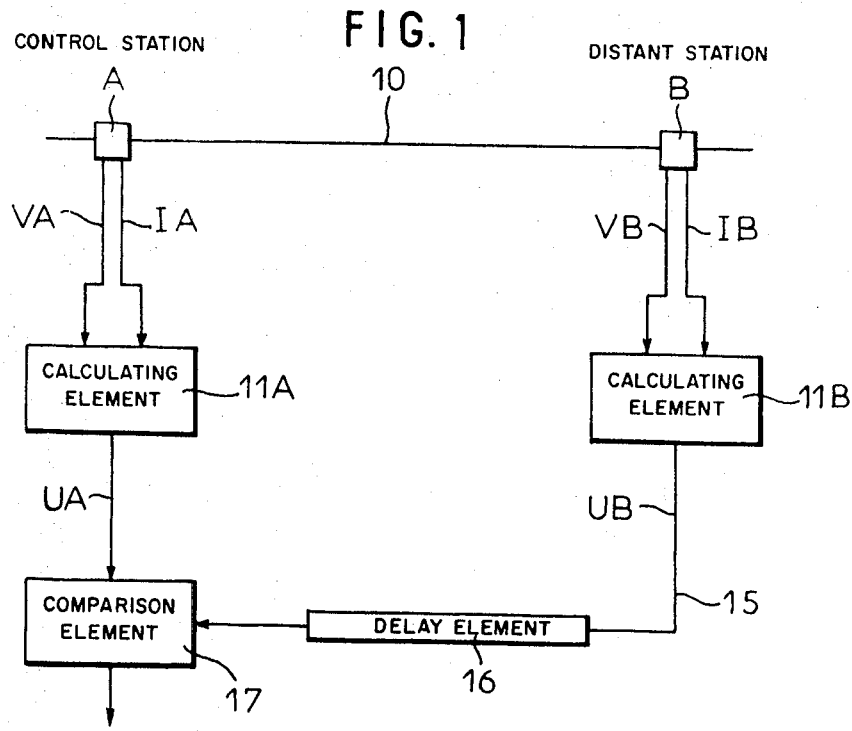
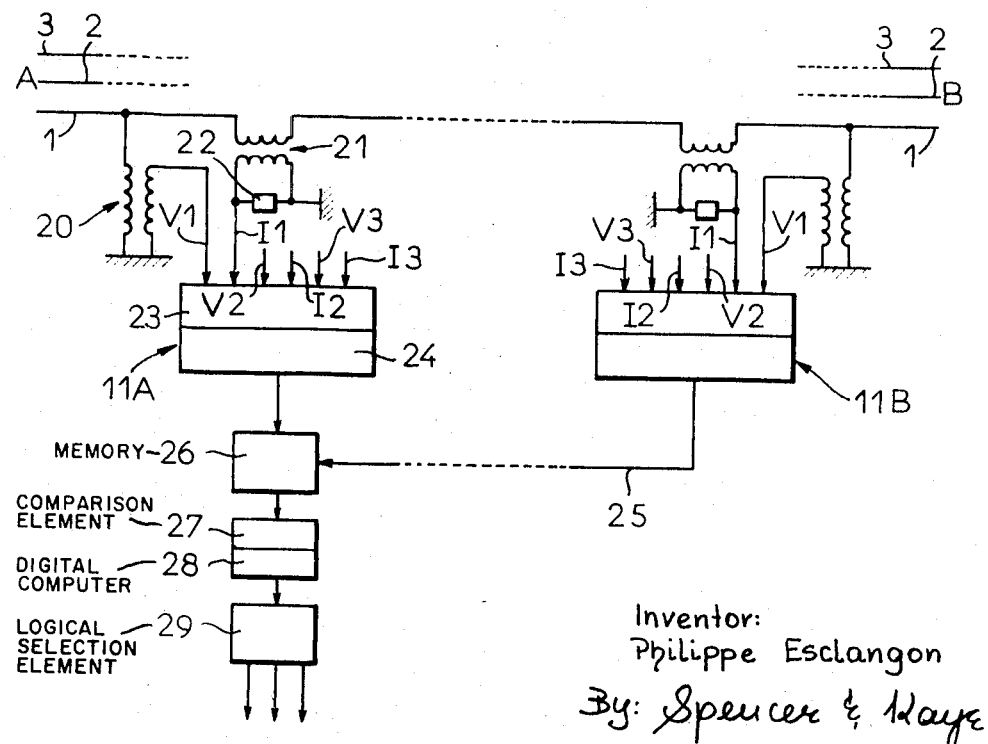

DETECTION OF FAULTS ON A POWER TRANSMISSION LINE

The present invention generally relates to the detection of faults on a power transmission line, and is more particularly directed to fault detection on a flat three-phase line, with selection of the defective phase.

Various methods of protection of very high tension overhead power transmission lines are already known which utilize a transmission of information between the two extremities of the line to be protected. There are concerned for example, a differential longitudinal protection, a phase-meter longitudinal protection or a directional longitudinal protection system.

Quite apart from the disadvantages inherent in the use of a transmission link, these methods of protection may prove insensitive to faults which do not lead to a sufficiently large modification of the ratio of amplitudes or phase-displacements of the quantities compared. In addition, the capacitive load current, important for long lines, may result in disturbances and may thus cause untimely tripping.

The present invention has for its object a protection method and apparatus of the kind which utilizes the transmission of information, but which is free from the disadvantages referred to above.

According to the invention, for the detection of faults, especially on a power transmission line, between a control station and a distant station, with comparison at the control station of information transmitted from the distant station with similar information derived from the control station, the information utilized comprises at least one test quantity prepared by subtracting from a voltage quantity, a current quantity multiplied by a characteristic impedance quantity, the value of the test quantity at the distant station being modified by a propagation factor before comparison with the corresponding value of the test quantity at the control station.

Depending on whether the result of this comparison is other than zero or nil, there exists or there does not exist a fault.

A method of this kind which is equally suitable for the detection of faults on a single-phase line and the detection of faults on a three-phase line, in which case it further permits the selection of the defective phase, has the advantage of providing a reliable and rapid detection which is sufficiently sensitive to reveal faults which do not result in a reversal of the power transmitted or in an overload on the line, is insensitive to the capacitive current in the case of long lines, and insensitive to power oscillations and load transfers.

The characteristic features and advantages of the invention will further be brought out in the description which follows below, given by way of example, reference being made to the accompanying diagrammatic drawings, in which:

FIG. 1 is a simplified block diagram illustrating the application of the invention to a single-phase line;

FIG. 2 is a block diagram relating to a three-phase line.

As is well known, it is possible to assimilate a polyphase system with $n$ phases to $n$ monophase voltage and current systems, known as modes. Each system is independently propagated over several of the $n$ conductors of the polyphase system, and individually follows the laws of propagation over a single-phase line, with the variable propagation constants from one system to the other.

In the case, for example, of a flat three-phase line, three modes can be determined: one so-called interphase mode, a bifilar mode and a homopolar mode.

Furthermore, when analyzing the permanent conditions existing on a line, it is observed that these conditions result from two waves, one being propagated in one direction, known as the progressive or incident wave, and the other being propagated in the other direction and known as the retrograde or reflected wave.

At two different points of the line, these waves have an amplitude ratio which is a function of the propagation factor over the line and are displaced in time, by a time $t$ equal to the time of propagation between these two points.

These relations are independent of the condition existing on the line and only depend on the characteristics of the line; on the other hand, they are affected by any particular fault which appears on the line. In fact, a fault of this kind inevitably modifies the propagation factor to a considerable extent.

It is on the considerations which have expressly been summarized above that the present invention is based.

In order that the invention may be better understood, one of its applications to a single-phase line will first be rapidly considered with reference to FIG. 1.

On this line, shown at 10, are diagrammatically indicated at A a control station and at B a distant station at a distance $d$ from each other, and between which it is desired to detect the presence of a possible fault.

At the control station A, a calculating element 11A receives the current and voltage $VA$ and $IA$ of the line, and prepares a test quantity:

$$UA = VA - Zc\ IA$$

in which expression $Zc$ is the characteristic impedance of the line.

Similarly, at the distant station B, a calculating element 11B prepares the corresponding value $UB$ of this test quantity:

$$UB = VB - Zc\ IB$$

The method according to the invention consists of comparing $UA$ with $UB$ after having multiplied $UB$ by the propagation factor $e^{-\gamma d}$ in which $\gamma$ is the constant of propagation over the line:

$$\gamma = \alpha + j\beta$$

$$e^{-\gamma d} = e^{-\alpha d} \cdot e^{-j\beta d}$$

The first term of the propagation factor $e^{-\gamma d}$ is therefore an amplitude ratio and the second is a delay ratio.

As will be readily understood, due to the above preliminary considerations, if $UB \cdot e^{-\gamma d}$ is equal to $UA$, the propagation over the line is normal and there is no fault; if $UB \cdot e^{-\gamma d}$ is different from $UA$, a fault exists which has modified the value of the propagation constant.

In practice, and as shown diagrammatically in FIG. 1, the comparison of the values at the stations A and B of the test quantity according to the invention can be carried out in the following manner:

The distant station B is connected to the control station by a communication link 15; following the example shown, this link 15 has a propagation time $\tau$ which introduces the delay corresponding to the term $e^{ij\beta d}$. If the propagation time is less than the desired delay, there may be added a delay line such as 16 to the link.

The control station A comprises a comparison element 17 which receives $UA$ and $UB$ and which compares $UB \cdot e^{-j\beta d}$ with $UA$. For example, there may be utilized a cathode-ray oscillograph, the amplifiers of which have gains regulated in such manner as to compensate for the attenuations in the line 10 and the link 15, in the proportion of the amplitude factor $e^{-\alpha d}$.

FIG. 2 relates to the application of the invention to a three-phase line in which the phases 1, 2 and 3 have been indicated diagrammatically at 1, 2 and 3 respectively.

In the case of phase 1, for example, the voltage $V1$ at the station A is applied to a calculating element 11A through the intermediary of a voltage stepdown transformer 20; at the same time, a current-reducing transformer 21, the secondary of which comprises a shunt 22, applies a voltage proportional to the current $I1$ of the phase to the calculating element 11A.

Similar arrangements are adopted for the other phases.

The calculating element 11A comprises on the one hand numerical converters 23, which receive the various voltages defined above and convert them, every millisecond for example, to numerical values, and on the other hand, a calculating unit 24 which prepares the values at the station A of the two following test quantities:

$$U1 = V1 + 1\ V2 + V3 - (I1 + C1\ I2 + I3)$$

$$U2 = V1 - 3 - Zc2\ (I2-3)\ \text{in which expressions } K1 \text{ and } C1$$

are the coefficients corresponding to the mode of interphase propagation, for the voltages and currents respectively, $Zc1$ and $Zc2$ are the characteristic impedances corresponding to the mode of interphase propagation and to the mode of bifilar propagation respectively, $I1$, $I2$ and $I3$ being counted positively going from A to B.

$U1$ $(A)$ and $U2$ $(A)$ will be taken to represent the values at the control station A of the test quantities $U1$ and $U2$, as these are prepared by the calculating unit 24 of the calculating element 11A of this station.

At the same time, at the distant station B, a similar calculating element 11B prepares the corresponding values $U1$ $(B)$ and $U2$ $(B)$ of these test quantities. These values are directed to the control station A by a communication link 25 of any kind.

At the station A, the values $U1$ $(B)$ and $U2$ $(B)$ are received by a memory 26 which also receives the values $U1$ $(A)$ and $U1$ $(B)$.

This memory plays a part similar to that of the delay line in the previous example of application. In order to introduce the necessary delay $e^{-j\beta d}$ it is necessary that the values of the test quantities derived from the distant station B should only be utilized after a time equal to the propagation time $t$ over the line between the stations A and B.

In practice:

If the time of transmission $\tau$ is equal to $5$, the memory 26 is not employed;

If $\tau$ is greater than $t$, the values $U1$ $(A)$, and $U2$ $(A)$ are put into memory at 26 until the arrival of the values $U1$ $(B)$ and $U2$ $(B)$;

If $\tau$ is less than $t$, it is the values $U1$ $(B)$ and $U2$ $(B)$ which are put into memory to the extent of the time $t$.

On the downstream side of the memory 26 is provided a comparison element 27 which prepares the following quantities from the amplitudes of the test quantities:

$$S1 = e^{-\alpha_1 d} U1(B) - U1(A)$$

$$S2 = e^{-\gamma_2 d} U2(B) - U2(A)$$

in which expressions $\alpha1$ and $\alpha2$ are respectively the real parts of the constants of propagation $\gamma1$ and $\gamma2$, corresponding respectively the mode of interphase propagation and to the mode of bifilar propagation.

With the comparison element 27 is associated a digital computer 28 which prepares the following quantities from the quantities $S1$ and $S2$:

$$Q1 = (S1/Zc\ 1) - S2/Zc2)$$
$$Q2 = S2/Zc2$$
$$Q3 = (S1/Zc\ 1) + (S2/Zc\ 2)$$

Mathematical calculation shows that:

when there is no fault, the three quantities $Q1$, $Q2$ and $Q3$ are zero;

when a single-phase fault exists, two of these three quantities are different from zero, and that which remains zero depends on the defective phase;

when there is a polyphase fault, the three quantities $Q1$, $Q2$ and $Q3$ are all other than zero.

These results are assembled together in the Table given below:

|  | Q1 | Q2 | Q3 |
|---|---|---|---|
| Single-phase fault: |  |  |  |
| Phase 1 | 0 | + | + |
| Phase 2 | + | 0 | + |
| Phase 3 | + | + | 0 |
| Polyphase fault | + | + | + | in which the sign + has been given to a quantity $Q1$, $Q2$ or $Q3$ other than zero.

In practice, the control station A is provided, on the downstream side of the digital computer 28 with a logical selection element 29 which tests the quantities $Q1, Q3$, and thus determines the phase or phases which may be defective.

As has been confirmed by tests, the response time of the device according to the invention is very short; it may be of the order of a millisecond if a fairly rapid transmission means is employed, together with digital computer elements which work at high speed. In practice, it is possible to detect a break in the conductors of an overhead line even before the latter have reached the ground.

In addition, the device according to the invention may advantageously be used to detect faults which do not result in any overload and which do not produce any homopolar current and any change in the direction of the power transmitted, and these advantages apply irrespective of the length of the line.

It will of course be understood that the present invention is not restricted to the forms of application described and illustrated, but includes any alternative form of construction. In particular, the functions of the control station and the distant station may be interchanged.

What I claim is:

1. Apparatus for the detection of faults on a power transmission line connected between a control station and a distant station, said apparatus comprising:

a plurality of voltage sensing means, one for each said station, each connected for producing a signal representing the voltage level V on the transmission line at its respective station;

a plurality of current sensing means, one for each said station, each connected for producing a signal representing the current level I in the transmission line at its respective station;

a plurality of calculating means, one for each said station, connected to said voltage sensing means and said current sensing means of its respective station for producing an output signal $U$ equal to $V + K\ I$, where $k$ is proportional to the characteristic impedance of the transmission line, the value of each said output signal representing a test quantity for its associated station;

signal multiplying means connected to said calculating means of said distant station for multiplying the test quantity associated with said distant station by a quantity representing the propagation factor of the transmission line;

and comparison means connected to said calculating means of said control station and to said multiplying means for comparing the output values therefrom and providing an indication of the result of such comparison.

2. Apparatus as claimed in claim 1 wherein said voltage sensing means for each said station comprises a voltage step-down device; and said calculating means for each said station comprises a digital converter connected to receive the signals from said voltage sensing means and current sensing means of its associated station and for converting such signals into digital form, and a calculating unit connected to receive the digital signals from said digital converter for producing said output signal $u$ in digital form.

3. Apparatus as claimed in claim 2 wherein the transmission line is of the flat three-phase type, said calculating means prepare two test quantities $U1$ and $U2$ at each said station, and said comparison means prepare the quantities $S1$, $S2$, $Q1$, $Q2$ and $Q3$, where:

$$U1 = V1 + K1\ V2 + V3 - Zc\ 1\ (I1 + C1\ I2 + I3)$$

$V1$, $V2$ and $V3$ being the voltages of the three phases, $I1$, $I2$ and $I3$ are the currents of the three phases, taken positively from said control station to said distant station, $K1$ and $C1$ are interphase propagation mode coefficients corresponding to the voltages and currents, respectively, and $Zc\ 1$ is the characteristic impedance corresponding to the interphase propagation mode;

$$U2 = V1 - V3 - Zc2\ (I2-3)$$

$Zc2$ being the characteristic impedance corresponding to the bifilar propagation mode;

$$S1 = e^{-\gamma_1 d} U1\ (B) - U1\ (A)$$
$$S2 = e^{-\gamma_2 d} U2\ (b) - U2\ (A)$$

$(A)$ identifying test quantities associated with said control station, $(B)$ identifying test quantities associated with said distant station, $\gamma 1$ being the propagation constant for the interphase mode, $\gamma_2$ being the propagation constant for the bifilar mode, and $d$ being the distance between said stations; and $$Q1\ (S1/Zc1) - (S2/Zc2)$$
$$Q2 = S2/Zc2$$
$$Q3 = (S1/Zc1) + (S2/Zc2);$$

and wherein apparatus further comprises a logical selection element connected to said comparison means for receiving the quantities $Q1$, $Q2$, $Q3$, for analyzing such quantities to determine the existence of a line fault and to identify the line on which such fault appears.

4. Apparatus as claimed in claim 1 further comprising a memory disposed at the control station and connected to receive the test quantity for at least one said station and to temporarily store such quantity for a period sufficient to compensate for any difference between times of arrival of said test quantities at said comparison means and the propagation time between said stations over said transmission line.